Patented Apr. 17, 1934

1,955,440

UNITED STATES PATENT OFFICE 1,955,440

METHOD OF WEIGHTING

Theodore Scheuermann, Garfield, N. J., assignor to United Piece Dye Works, Lodi, N. J., a corporation of New Jersey No Drawing. Application July 7, 1930, Serial No. 466,039. Renewed August 15, 1933

13 Claims. (Cl. 8—13)

This invention relates to weighting and more particularly to the phosphating or fixing step of the tin weighting process.

Prior to this invention the usual process for weighting textile materials consisted in bringing the boiled-off fiber, in the case of silk, in contact in successive baths with substances which reacted to form an insoluble substance. According to such a process, the silk in the boiled-off condition was immersed in a solution of a tin salt, such as an aqueous solution of tin tetrachloride, for a period of time sufficient to allow the solution to completely saturate and penetrate the fiber. After the removal from the solution of the tin salt, the surplus solution was removed in any convenient manner, such as by centrifuging. The impregnated material was then washed with water whereby the tin salt was hydrolyzed. The hydrolyzed tin salt was then fixed by transforming it to some insoluble salt. Usually, the conversion was effected by subjecting the material containing the hydrolyzed tin salt to an aqueous solution containing disodium phosphate ($Na_2HPO_4.12H_2O$) whereby an insoluble compound of tin and phosphate was obtained. The tin salt and sodium phosphate treatment could be repeated as many times as necessary to produce the desired weighting.

The previously described procedure utilized a fixing solution which contained a relatively high concentration of disodium phosphate. Such a concentration had been found essential to make the process economic. If the concentration of the phosphate in the solution were diminished, it would be necessary to increase the time for the pass as well as elevate the temperature at which the reaction was carried out. At increased temperatures, the phosphate may degrade and injure the silk. Hence, it is desirable to maintain the temperature of the solution of the phosphate sufficiently low so that the silk may not be deleteriously affected. The time necessary for maintaining the goods in contact with the phosphate should be of sufficient length to completely fix the compound. It should be of such duration as to permit any unhydrolyzed tin salt to react with the phosphate and to permit the latter to completely penetrate throughout the entire mass of the fibers. In other words, the period of time should be such as is necessary to bring the reaction to completion. Otherwise, any chloride present might decompose, thereby forming hydrochloride acid which might injure the fiber.

I have found that by incorporating in the aqueous solution containing the phosphate certain agents, such as salts, more particularly described hereafter, the fixing reaction may be accelerated to completion and a weighting obtained which is substantially equal to that previously secured and desired.

It is therefore an object of this invention to provide a method of weighting by the phosphate method wherein the aqueous solution of the phosphate contains an agent, such as a salt, which accelerates the reaction to completion.

A specific object of this invention is to provide a method of weighting wherein the tin compound is fixed by an aqueous solution of a phosphate containing a halide of an alkali metal and specifically sodium chloride.

Other objects of this invention will appear from the following description and appended claims.

In accordance with the principles of this invention, textile fibers, such as silk, after the preliminary boil-off treatment, are immersed or otherwise subjected to an aqueous solution containing 14% to 30% of a tin salt such as tin tetrachloride. The silk is permitted to remain in this solution until it is completely penetrated by and saturated with the tin salt. It is then removed and the surplus tin salt removed in any well-known manner, such as by centrifuging or whizzing. The whizzed material is then treated with water to hydrolyze the tin salt. The material containing the hydrolyzed tin salt is then subjected to a solution containing a phosphate, prepared in accordance with this invention, whereby the tin salt is fixed and the weighting obtained. If desired, the treatments with the tin salt and the phosphating solution may be repeated to secure the desired weighting.

The phosphating solution which I utilize comprises an aqueous solution containing disodium phosphate ($Na_2HPO_4.12H_2O$) and an agent which serves to accelerate the fixing reaction to completion. Numerous substances and compounds may be employed as the accelerating medium. For instance, satisfactory results may be secured when the halides of the alkali metals are employed as the accelerating agents. Good results have also been obtained by using as the accelerating agent sodium benzoate ($NaC_7H_5O_2$), sodium nitrate ($NaNO_3$), sodium thiocyanate ($NaCNS$), sodium acetate ($NaC_2H_3O_2.3H_2O$), sodium chlorate ($NaClO_3$), sodium sulphate ($Na_2SO_4.10H_2O$), sodium thiosulphate ($Na_2S_2O_3.5H_2O$), sodium bromate ($NaBrO_3$), or the corresponding potassium and ammonium salts.

The proportions of the ingredients constituting the phosphating solution may vary within wide limits. The proportion of the salt used may wholly or partly replace up to 90% of the quantity of phosphate used in fixing solution prior to this invention. In other words, the fixing solution may contain disodium phosphate in an amount not less, and generally more or greater, than 10% based on the quantity of accelerating agent present. Usually, it is desirable to employ an aqueous solution containing approximately 75 grams of disodium phosphate per liter, though this is not essential for the successful practice of the instant invention.

The following examples illustrate several specific aqueous solutions which have given satisfactory results:

*Example 1*

| | Grams per liter of water |
|---|---|
| Sodium chloride | 40 |
| Disodium phosphate | 75 |

*Example 2*

| | |
|---|---|
| Sodium sulphate ($Na_2SO_4.10H_2O$) | 60 |
| Disodium phosphate | 75 |

*Example 3*

| | |
|---|---|
| Sodium nitrate | 30 |
| Disodium phosphate | 75 |

The product resulting from the method hereinabove described possesses a weighting substantially equal to that produced by the prior art method to which reference has been made. Moreover, it has substantially the same feel and appearance. By the selection of an appropriately priced salt, such as, for instance, sodium chloride, the process may be made more economical than that heretofore used. An additional advantage is that this method does not require any additional equipment nor is any modification of the existing apparatus necessary. The manipulative steps of the present method and that of the prior art being substantially the same, the present form of apparatus may be used.

Since it is obvious that various modifications and changes may be made in the specific details above set forth and described without departing from the nature of the invention, the invention is not restricted thereto except as set forth in the appended claims.

I claim:

1. In a method of tin weighting the step of fixing the tin compound which comprises subjecting the material containing the compound of tin to an aqueous solution containing a phosphate and a salt of an alkali metal to accelerate the reaction to completion.

2. In a method of tin weighting the step of fixing the tin compound which comprises subjecting the material containing the compound of tin to an aqueous solution containing a phosphate and a halide of an alkali metal.

3. In a method of tin weighting the step of fixing the tin compound which comprises subjecting the material containing the compound of tin to an aqueous solution containing a phosphate and sodium chloride.

4. In a method of tin weighting the step of fixing the tin compound which comprises subjecting the material containing the compound of tin to an aqueous solution containing a phosphate and a salt of an alkali metal to accelerate the reaction to completion, the amount of phosphate being not less than 10% of the quantity of the salt present.

5. In a method of tin weighting the step of fixing the tin compound which comprises subjecting the material containing the compound of tin to an aqueous solution containing a phosphate and a halide of an alkali metal, the amount of phosphate being not less than 10% of the quantity of halide present.

6. In a method of tin weighting the step of fixing the tin compound which comprises subjecting the material containing the compound of tin to an aqueous solution containing a phosphate and sodium chloride, the amount of phosphate being not less than 10% of the quantity of sodium chloride present.

7. In a method of tin weighting the step of fixing the tin compound which comprises subjecting the material containing the compound of tin to an aqueous solution containing 75 grams per liter of disodium phosphate and 40 grams per liter of sodium chloride.

8. In a method of tin weighting the step of fixing the tin compound which comprises subjecting the material containing the compound of tin to an aqueous solution containing a phosphate and sodium sulphate.

9. In a method of tin weighting the step of fixing the tin compound which comprises subjecting the material containing the compound of tin to an aqueous solution containing a phosphate and sodium sulphate, the amount of phosphate being not less than 10% of the quantity of sodium sulphate present.

10. In a method of tin weighting the step of fixing the tin compound which comprises subjecting the material containing the compound of tin to an aqueous solution containing 75 grams per liter of disodium phosphate and 60 grams per liter of sodium sulphate.

11. In a method of tin weighting the step of fixing the tin compound which comprises subjecting the material containing the compound of tin to an aqueous solution containing a phosphate and sodium nitrate.

12. In a method of tin weighting the step of fixing the tin compound which comprises subjecting the material containing the compound of tin to an aqueous solution containing a phosphate and sodium nitrate, the amount of phosphate being not less than 10% of the quantity of sodium nitrate present.

13. In a method of tin weighting the step of fixing the tin compound which comprises subjecting the material containing the compound of tin to an aqueous solution containing 75 grams per liter of disodium phosphate and 30 grams per liter of sodium nitrate.

THEODORE SCHEUERMANN.